(12) United States Patent
Song et al.

(10) Patent No.: US 11,137,671 B2
(45) Date of Patent: Oct. 5, 2021

(54) CAMERA LENS AND IMAGING DEVICE

(71) Applicants: Beijing MADV Technology Co., Ltd., Beijing (CN); JiangXi LianChuang Electronic Co., Ltd., Jiangxi (CN); Beijing Xiaomi Mobile Software Co., Ltd., Beijing (CN)

(72) Inventors: Weitao Song, Beijing (CN); Yetao Huang, Beijing (CN); Xuming Liu, Beijing (CN); Jiyong Zeng, Beijing (CN)

(73) Assignees: Beijing MADV Technology Co., Ltd., Beijing (CN); JiangXi LianChuang Electronic Co., Ltd., Jiangxi (CN); Beijing Xiaomi Mobile Software Co.. Ltd., Beijing (CN)

( * ) Notice: Subject to any disclaimer, the term of this patent is extended or adjusted under 35 U.S.C. 154(b) by 293 days.

(21) Appl. No.: 16/299,823

(22) Filed: Mar. 12, 2019

(65) Prior Publication Data
US 2019/0204726 A1 Jul. 4, 2019

Related U.S. Application Data

(63) Continuation of application No. PCT/CN2016/111044, filed on Dec. 20, 2016.

(30) Foreign Application Priority Data

May 4, 2016 (CN) .......................... 201610290697.X

(51) Int. Cl.
G02B 17/00 (2006.01)
G03B 37/04 (2021.01)
(Continued)

(52) U.S. Cl.
CPC ............. *G03B 37/04* (2013.01); *G02B 13/06* (2013.01); *G03B 17/17* (2013.01); *G02B 27/0018* (2013.01); *G03B 37/00* (2013.01)

(58) Field of Classification Search
CPC ........ G03B 37/04; G03B 17/17; G03B 37/00; G02B 13/06; G02B 27/0018
(Continued)

(56) References Cited

U.S. PATENT DOCUMENTS 4,468,100 A     8/1984  Itoh et al.
2013/0242414 A1  9/2013  Iwamoto

FOREIGN PATENT DOCUMENTS

CN      1497289 A      5/2004
CN    201340474 Y     11/2009
(Continued)

OTHER PUBLICATIONS

First Office Action dated Apr. 3, 2019, from the State Intellectual Property Office of People's Republic of China, in counterpart Chinese Application No. 201610290697.X.
(Continued)

*Primary Examiner* — William Choi
(74) *Attorney, Agent, or Firm* — Finnegan, Henderson, Farabow, Garrett & Dunner, L.L.P.

(57) ABSTRACT

The disclosure discloses a camera lens and an imaging device, and the camera lens includes: a front lens group close to the object-side, a reflective element, a diaphragm and a rear lens group close to the image-side, wherein the front lens group comprises a first lens and a second lens; the rear lens group includes a third lens, a fourth lens, a fifth lens, a sixth lens and a seventh lens; the front lens group is a negative refractive index lens group, the rear lens group is a positive refractive index lens group; the reflective element is disposed between the second lens and the third lens; the
(Continued)

diaphragm is disposed between the third lens and the fourth lens. The camera lens and the imaging device of the present disclosure may not generate vignetting at the large field of view.

16 Claims, 3 Drawing Sheets

(51) Int. Cl.
*G02B 13/06* (2006.01)
*G03B 17/17* (2021.01)
*G03B 37/00* (2021.01)
*G02B 27/00* (2006.01)

(58) Field of Classification Search
USPC .................. 359/726, 736, 751, 755, 793
See application file for complete search history.

(56) References Cited

FOREIGN PATENT DOCUMENTS

| | | | | |
|---|---|---|---|---|
| CN | 203133374 U | 8/2013 | | |
| CN | 103703403 A | 4/2014 | | |
| CN | 104142565 A | 11/2014 | | |
| CN | 104765129 A | 7/2015 | | |
| CN | 104880808 A | 9/2015 | | |
| CN | 105467560 A | * 4/2016 | | |
| CN | 105467560 A | 4/2016 | | |
| CN | 105527695 A | 4/2016 | | |
| CN | 105759404 A | * 7/2016 | ............ | G03B 37/04 |
| CN | 105759404 A | 7/2016 | | |
| CN | 205539662 U | 8/2016 | | |
| JP | 2014056048 A | 3/2014 | | |
| JP | 2015-180926 A | 10/2015 | | |

OTHER PUBLICATIONS

Notification to Grant Patent Right for Invention, dated May 12, 2020, from the State Intellectual Property Office of People's Republic of China, in counterpart Chinese Application No. 201610290697.X.

English version of International Search Report from the State Intellectual Property Office of People's Republic of China in corresponding International Application No. PCT/CN2016/111044, dated Mar. 2, 2017.

* cited by examiner

CAMERA LENS AND IMAGING DEVICE

CROSS-REFERENCE TO RELATED APPLICATIONS

This application is a continuation application of International Application No. PCT/CN2016/111044, filed on Dec. 20, 2016, which is based upon and claims priority to Chinese Patent Application No. 201610290697.X, filed on May 4, 2016, the entire content of all of which is incorporated herein by reference.

TECHNICAL FIELD

The present disclosure relates to the field of optical camera lens technology, and particularly, to a camera lens and an imaging device.

BACKGROUND

At present, in order to obtain full-space information, two imaging optical systems that are placed in opposite or stagger to each other can be used. Each optical system includes a wide-angle camera lens with a view angle greater than 180 degrees and an imaging sensing device that matches the wide-angle camera lens. By simultaneously obtaining image information of respective directions via the two imaging optical systems, and by unfolding the overlapping regions and splicing them, 4π solid angle full-space image information is formed.

However, the use of two wide-angle camera lenses each having a view angle greater than 180 degrees may inevitably cause the problem of optical center separation, and the optical center separation may degrade the image of the image-overlapping regions. Moreover, the farther the two wide-angle camera lenses are apart from each other in the direction of the optical axis, the more the deterioration of the image of the overlapping regions is.

In addition, most wide-angle camera lens structures that have a view angle exceeding 180 degrees, tend to have vignetting at a large field of view, so that the light of the field of view may not fill the entire field of view. At the same time, the formation of ghost is not considered in the wide-angle camera lens structures having a view angle exceeding 180 degrees, and the formation of ghost is not avoided in the design of those structures, so the signal-to-noise ratio is relatively low.

SUMMARY

It is an object of the present disclosure to provide a camera lens and an imaging device capable of at least partially eliminating ghost generated by the camera lens and improving the signal-to-noise ratio of the system.

According to a first aspect of the present disclosure, a camera lens is provided, including: a front lens group, wherein the front lens group is close to an object-side; a rear lens group, wherein the rear lens group is close to an image-side; a reflective element; and an aperture, wherein the front lens group includes a first lens and a second lens, the rear lens group includes a third lens, a fourth lens, a fifth lens, a sixth lens and a seventh lens, the front lens group is a negative refractive index lens group, and the rear lens group is a positive refractive index lens group, the reflective element is disposed between the second lens and the third lens, and the aperture is disposed between the third lens and the fourth lens.

According to a second aspect of the present disclosure, an imaging device is provided, including: two of the camera lenses, wherein the two camera lenses are placed in opposite to each other, optical axes of the two camera lenses are parallel to each other, and a view angle of each of the two camera lenses is greater than 180 degrees.

According to a third aspect of the present disclosure, another imaging device is provided, including at least one of the camera lenses.

The camera lens and the imaging device provided based on the above technical solutions may not generate vignetting at the large field of view, so that the imaging illuminance of the field of view is uniform, and the light intensity energy of the scene can be absorbed to the utmost extent. At the same time, the optical path forming stray light is taken into account for the camera lens, and the structures of the lenses are controlled to eliminate the ghost produced by the camera lens, so that the signal-to-noise ratio of the system can be improved. When the camera lens and the imaging device are applied in panoramic shooting, the size of the two front and rear lens groups in one direction is reduced by the reflecting element, and the deterioration of the image-splicing regions is reduced.

BRIEF DESCRIPTION OF THE DRAWINGS

The drawings of the present disclosure are for facilitating further understanding of the technical solutions of the embodiments of the present disclosure.

Figure 1:
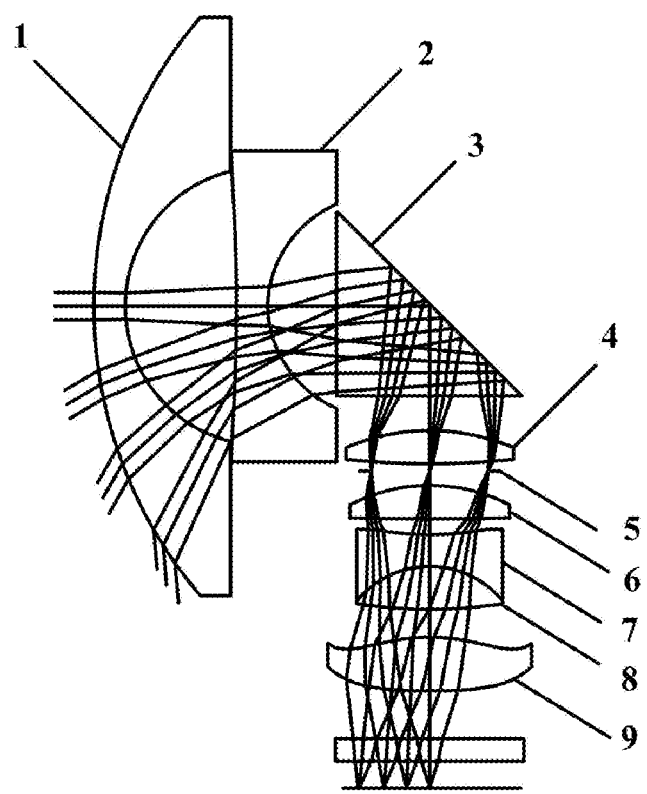
FIG. 1 is a schematic structural diagram of a camera lens according to an embodiment of the present disclosure.

DESCRIPTION OF THE REFERENCE SIGNS 1 a first lens
2 a second lens
3 a reflective element
4 a third lens
5 a diaphragm
6 a fourth lens
7 a fifth lens
8 a sixth lens
9 a seventh lens.

DETAILED DESCRIPTION

The technical solutions of the present disclosure are further described in detail below through the accompanying drawings and embodiments. The following embodiments are used to illustrate the present application, but are not intended to limit the scope of the present application.

FIG. 1 is a schematic diagram of a camera lens according to an embodiment of the present disclosure. The camera lens includes: a front lens group, a rear lens group, a reflective element, and a diaphragm. As shown in FIG. 1, the camera lens includes, in an order from the object-side to the image-side, a first lens 1, a second lens 2, a reflective element 3, a third lens 4, a diaphragm 5, a fourth lens 6, and a fifth lens 7, a sixth lens 8, and a seventh lens 9.

The front lens group includes the first lens 1 and the second lens 2, and the rear lens group includes the third lens 4, the fourth lens 6, the fifth lens 7, the sixth lens 8, and the seventh lens 9. In the embodiment, the front lens group is a negative refractive index lens group, and the rear lens group is a positive refractive index lens group.

In some embodiments, the first lens 1 is a negative meniscus lens, the second lens 2 is a double concave negative lens, both the third lens 4 and the fourth lens 6 are positive lenses, the fifth lens 7 is a double concave negative lens, and both the sixth lens 8 and the seventh lens 9 are positive lenses.

In some embodiments, the reflective element 3 is a reflective planar mirror or a right-angle reflective prism.

In some embodiments, the camera lens satisfies the following condition: $1.3 \leq |f12/f| \leq 2$, and $3.0 \leq |f37/f| \leq 4.0$, where f is the focal length of the camera lens, f12 is the focal length of the front lens group, and f37 is the focal length of the rear lens group.

In some embodiments, the fifth lens 7 and the sixth lens 8 are glued together, the Abbe number of the fourth lens 6 and the seventh lens 9 is greater than 40, the Abbe number of the sixth lens 8 is greater than 50, and the Abbe number of the fifth lens 7 is less than 40.

In some embodiments, the camera lens satisfies the following condition: $6 \leq |f1/f| \leq 8$, $2.5 \leq |f2/f| \leq 3.5$, $4 \leq |f3/f| \leq 6$, $4.5 \leq |f4/f| \leq 6.2$, $3.5 \leq |f7/f| \leq 5.5$, and $3.5 \leq |f47/f| \leq 5.5$, where f is the focal length of the camera lens, f1 is the focal length of the first lens 1, and f2 is the focal length of the second lens 2, f3 is the focal length of the third lens 4, f4 is the focal length of the fourth lens 6, f47 is the combined focal length of the fourth lens 6, the fifth lens 7, the sixth lens 8, and the seventh lens 9, and f7 is the focal length of the seventh lens 9.

In the embodiment, the front lens group of the camera lens adopts a negative refractive index lens group and the rear lens group thereof adopts a positive refractive index lens group. Accordingly, the camera lens as a whole adopts a structure in which the positive refractive index lens group and the negative refractive index lens group are separated, so that aberrations of the system introduced due to large wide-angle may be maximally corrected.

The camera lens provided by the embodiment does not generate vignetting at the large field of view, so that the imaging illuminance of the field of view is uniform, and the light intensity energy of the scene can be absorbed to the utmost extent. At the same time, the optical path forming stray light is taken into account for the camera lens, and the structures of the lenses are controlled to eliminate the ghost produced by the camera lens, so that the signal-to-noise ratio of the system can be improved. When the camera lens and the imaging device are applied in panoramic shooting, the size of the two front and rear lens groups in one direction is reduced by the reflecting element, and the deterioration of the image-splicing regions is reduced.

In addition, the camera lens provided by the embodiment of the present disclosure can be widely applied to the wide-angle scene and panoramic shooting. For example, it can be applied to industries such as shooting and monitoring, entertainment culture, education and training, exhibition display, and the like.

In an embodiment of the present disclosure, the parameters of the camera lens as shown in FIG. 1 are normalized, then it can be obtained that the effective focal length of the camera lens is f=1 mm, the F number F#=2, and the view angle is 2ω=190°. From the object-side to the image-side, they are the first lens, the second lens, the reflective element, the third lens, the diaphragm, the fourth lens, the fifth lens, the sixth lens and the seventh lens sequentially. Taking the object-side surface number of the first lens as 1, and so on, using a right-angle prism as the reflective element, the object-side transmission surface number is 5, the reflection surface number is 6, the image-side transmission surface number of the reflection element is 7, the object-side and image-side surface number of the protection glass of the display device are 18 and 19 respectively, and the image surface number is 21. The design data of each optical element in this embodiment is shown below in Table 1.

TABLE 1

Normalized effective focal length f = 1 mm; view angle 2ω = 190°;

| Surface number | Curvature radius | Surface spacing | Refractive index | Abbe number |
|---|---|---|---|---|
| 1 |  | 9.843 | 0.102 | 1.734 | 51.5 |
| 2 |  | 3.093 | 0.323 |  |  |
| 3 | Aspherical | −53.942 | −0.0185 | 1.694 | 53.2 |
| 4 | Aspherical | 2.247 | 0.445 |  |  |
| 5 |  | Unlimited | 1.998 | 1.923 | 20.9 |
| 6 | Reflective surface | Unlimited | 1.998 | 1.923 | 20.9 |
| 7 |  | Unlimited | 0.772 |  |  |
| 8 |  | 4.897 | 0.735 | 1.805 | 25.5 |
| 9 |  | −18.935 | 0.165 |  |  |
| 10 | Diaphragm | Unlimited | 0.319 |  |  |
| 11 |  | 3.947 | 0.742 | 1.773 | 49.6 |
| 12 |  | −89.598 | 0.352 |  |  |
| 13 |  | −7.242 | 0.708 | 1.923 | 20.9 |
| 14 |  | 2.146 | 0.956 | 1.618 | 63.4 |
| 15 |  | −10.911 | 0.618 |  |  |
| 16 | Aspherical | 3.983 | 1.197 | 1.755 | 51.2 |
| 17 | Aspherical | −14.037 | 1.063 |  |  |
| 18 |  | Unlimited | 0.500 | 1.517 | 64.2 |
| 19 |  | Unlimited | 0.597 |  |  |
| 21 | Image surface | Unlimited |  |  |  |

It should be noted that the front surface of the second lens and the front and rear surfaces of the third lens are aspherical surfaces, and the shape of the aspherical surface is defined by using the paraxial curvature C (reciprocal of the radius shown by the corresponding position in Table 1), the height H apart from the optical axis, the aspherical coefficient and an equation using X as the aspheric amount in the direction of the optical axis, and the equation is as follows:

$$X = \frac{CH^2}{1 + \sqrt{1-(1+K)C^2H^2}} + A4H^4 + A6H^6 + A8H^8 + A10H^{10},$$

where K, A4, A6, A8 and A10 are aspherical coefficients, and the aspherical data in the above embodiment is as follows:

The third surface: K=−1; A4=−0.001302; A6=1.5031×10$^{-5}$; A8=−4.5943×10$^{-6}$; and A10=−2.9967×10$^{-7}$.

The fourth surface: K=−0.2288; A4=−0.002534; A6=−1.9089×10$^{-5}$; A8=−7.1033×10$^{-5}$; and A10=2.3345×10$^{-5}$.

The sixteenth surface: K=−2.8283; A4=−0.0005238; A6=−0.0008343; A8=−0.0002177; and A10=−1.7867×10$^{-6}$.

The seventeenth surface: K=9.3393; A4=−0.005973; A6=−0.001183; A8=−2.6893×10$^{-5}$; and A10=2.1367×10$^{-6}$.

It should be understood that, in this embodiment, if two lenses are glued together, their gluing surface is looked as one surface.

Figure 2:
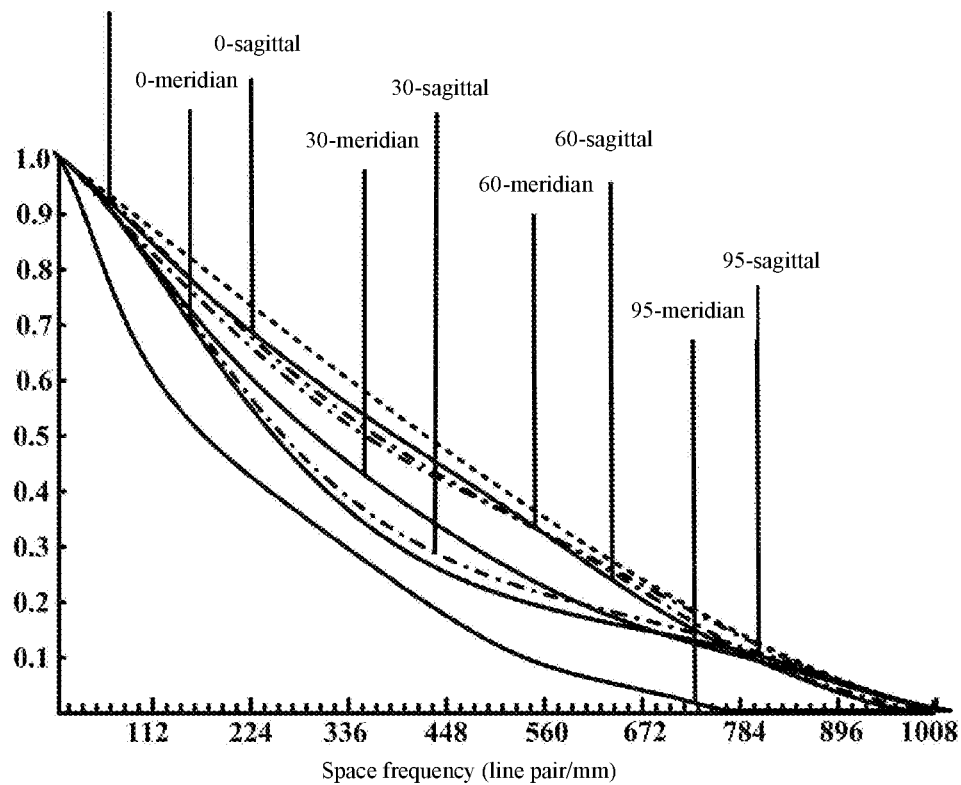
FIG. 2 is a view showing the optical performance of a camera lens according to an embodiment of the present disclosure.

The optical performance view shown in FIG. 2 is an optical performance view of the camera lens according to the above embodiment. It can be seen from FIG. 2 that the optical performance MTF of the camera lens is close to the diffraction limit.

The camera lens provided by an embodiment of the present disclosure has been described in detail in conjunction with FIG. 1 and FIG. 2. An imaging device according to an embodiment of the present disclosure is described in detail below with reference to FIG. 3.

Figure 3:
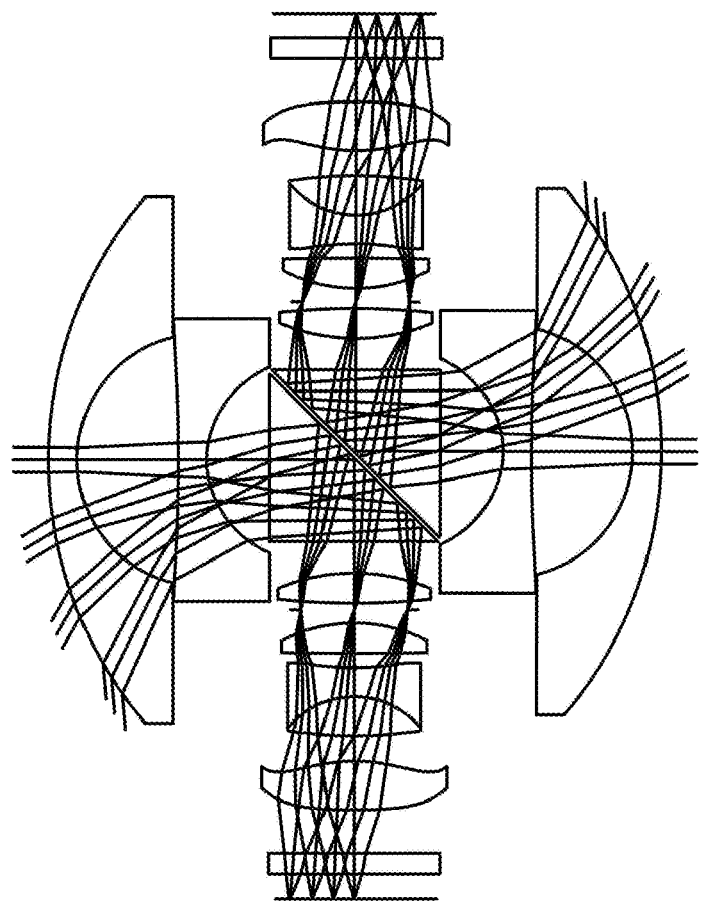
FIG. 3 is a schematic structural diagram of an imaging device according to an embodiment of the present disclosure.

FIG. 3 is a schematic diagram of an imaging device according to an embodiment of the present disclosure. The imaging device shown in FIG. 3 includes two camera lenses as in any of the above embodiments. The structure of each camera lens in the two camera lenses is the same as that of the camera lens shown in FIG. 1. The two camera lenses are placed in opposite to each other, the optical axes of the two camera lenses are parallel to each other, and the view angle of each of the two camera lenses is greater than 180 degrees.

In the embodiment, a distance from the first vertex to the second vertex of the first lens of the front lens group included in one of the two camera lenses is d1, a distance from the first vertex to the second vertex of the first lens of the front lens group included in the other one of the two camera lenses is d2, the two camera lenses satisfy the following condition: d1=d2, and $8 \leq d1/f \leq 16$, wherein the first vertex is the intersection of the optical axis and an object-side surface of the first lens, the second vertex is the intersection of the optical axis and the reflective surface of the first lens, and f is the focal length of the camera lens.

The imaging device provided in this embodiment can obtain a 4π radians solid angle full-space field of view by two camera lenses each having a view angle greater than 180 degrees placed in opposite to each other. At the same time, since each camera lens includes a reflecting element, the size of the two front and rear lens groups included in the camera lens in one direction can be reduced, and the image deterioration of the splicing position of the panoramic camera lens is greatly reduced.

One embodiment of the present disclosure further provides an imaging device including at least one camera lens in the above embodiments. For example, the imaging device may be a mobile phone, and the camera lens in the embodiment of the present disclosure is used as a main camera lens and/or an auxiliary camera lens of the mobile phone; and the imaging device may also be other device that needs to use a camera lens, such as a camera, a video camera, a notebook computer, or a pad, etc.

The above specific embodiments of the present disclosure have further illustrated the objectives, technical solutions and beneficial effects of the present disclosure in detail. However, it shall be understood that the above are only specific embodiments of the present disclosure, and are not used to limit the protection scope of the present disclosure. Any modification, equivalent substitution, improvement, etc., made within the spirit and scope of the present disclosure is intended to be included in the scope of the present disclosure.

What is claimed is:

1. A camera lens, comprising:
   a front lens group, wherein the front lens group is close to an object-side;
   a rear lens group, wherein the rear lens group is close to an image-side;
   a reflective element; and
   a diaphragm,
   wherein the front lens group includes a first lens and a second lens,
   the rear lens group includes a third lens, a fourth lens, a fifth lens, a sixth lens and a seventh lens,
   the front lens group is a negative refractive index lens group, and the rear lens group is a positive refractive index lens group,
   the reflective element is disposed between the second lens and the third lens, and
   the diaphragm is disposed between the third lens and the fourth lens.

2. The camera lens according to claim 1, wherein the first lens is a negative meniscus lens, the second lens is a double concave negative lens, the third lens and the fourth lens are positive lenses, the fifth lens is a double concave negative lens, and the sixth lens and the seventh lens are positive lenses.

3. The camera lens according to claim 2, wherein the camera lens satisfies the following conditions:
   $1.3 \leq |f12/f| \leq 2$, and $3.0 \leq |f37/f| \leq 4.0$,
   where f is a focal length of the camera lens, f12 is a focal length of the front lens group, and f37 is a focal length of the rear lens group.

4. The camera lens according to claim 2, wherein the fifth lens and the sixth lens are glued together, an Abbe number of the fourth lens and the seventh lens is greater than 40, an Abbe number of the sixth lens is greater than 50, and an Abbe number of the fifth lens is less than 40.

5. The camera lens according to claim 2, wherein the camera lens satisfies the following conditions:
   $6 \leq |f1/f| \leq 8$, $2.5 \leq |f2/f| \leq 3.5$, $4 \leq |f3/f| \leq 6$, $4.5 \leq |f4/f| \leq 6.2$, $3.5 \leq |f7/f| \leq 5.5$, and $3.5 \leq |f47/f| \leq 5.5$,
   where f is a focal length of the camera lens, f1 is a focal length of the first lens, f2 is a focal length of the second lens, f3 is a focal length of the third lens, f4 is a focal length of the fourth lens, f47 is a combined focal length of the fourth lens, the fifth lens, the sixth lens, and the seventh lens, and f7 is a focal length of the seventh lens.

6. An imaging device, comprising: two camera lenses each according to claim 2, wherein the two camera lenses are placed in opposite to each other, optical axes of the two camera lenses are parallel to each other, and a view angle of each of the two camera lenses is greater than 180 degrees.

7. The imaging device according to claim 6, wherein a distance from a first vertex to a second vertex of the first lens of the front lens group included in one of the two camera lenses is d1, a distance from a first vertex to a second vertex of the first lens of the front lens group included in the other one of the two camera lenses is d2, and the two camera lenses satisfy the following conditions:
   d1=d2, and $8 \leq d1/f \leq 16$,
   wherein the first vertex is an intersection of the optical axis and an object-side surface of the first lens, the second vertex is an intersection of the optical axis and a reflective surface of the first lens, and f is a focal length of the camera lens.

8. The camera lens according to claim 1, wherein the reflective element is a reflective planar mirror or a right-angle reflective prism.

9. The camera lens according to claim 8, wherein the camera lens satisfies the following conditions:
   $1.3 \leq |f12/f| \leq 2$, and $3.0 \leq |f37/f| \leq 4.0$,
   where f is a focal length of the camera lens, f12 is a focal length of the front lens group, and f37 is a focal length of the rear lens group.

10. The camera lens according to claim 8, wherein the fifth lens and the sixth lens are glued together, an Abbe number of the fourth lens and the seventh lens is greater than 40, an Abbe number of the sixth lens is greater than 50, and an Abbe number of the fifth lens is less than 40.

11. The camera lens according to claim 8, wherein the camera lens satisfies the following conditions:

$6 \leq |f1/f| \leq 8$, $\quad 2.5 \leq |f2/f| \leq 3.5$, $\quad 4 \leq |f3/f| \leq 6$,
$4.5 \leq |f4/f| \leq 6.2$, $\quad 3.5 \leq |f7/f| \leq 5.5$, and
$3.5 \leq |f47/f| \leq 5.5$, where f is a focal length of the camera lens, f1 is a focal length of the first lens, f2 is a focal length of the second lens, f3 is a focal length of the third lens, f4 is a focal length of the fourth lens, f47 is a combined focal length of the fourth lens, the fifth lens, the sixth lens, and the seventh lens, and f7 is a focal length of the seventh lens.

12. An imaging device, comprising: two camera lenses each according to claim 8, wherein the two camera lenses are placed in opposite to each other, optical axes of the two camera lenses are parallel to each other, and a view angle of each of the two camera lenses is greater than 180 degrees.

13. The imaging device according to claim 12, wherein a distance from a first vertex to a second vertex of the first lens of the front lens group included in one of the two camera lenses is d1, a distance from a first vertex to a second vertex of the first lens of the front lens group included in the other one of the two camera lenses is d2, and the two camera lenses satisfy the following conditions:

d1=d2, and $8 \leq d1/f \leq 16$, wherein the first vertex is an intersection of the optical axis and an object-side surface of the first lens, the second vertex is an intersection of the optical axis and a reflective surface of the first lens, and f is a focal length of the camera lens.

14. An imaging device, comprising: two camera lenses each according to claim 1, wherein the two camera lenses are placed in opposite to each other, optical axes of the two camera lenses are parallel to each other, and a view angle of each of the two camera lenses is greater than 180 degrees.

15. The imaging device according to claim 14, wherein a distance from a first vertex to a second vertex of the first lens of the front lens group included in one of the two camera lenses is d1, a distance from a first vertex to a second vertex of the first lens of the front lens group included in the other one of the two camera lenses is d2, and the two camera lenses satisfy the following conditions:

d1=d2, and $8 \leq d1/f \leq 16$, wherein the first vertex is an intersection of the optical axis and an object-side surface of the first lens, the second vertex is an intersection of the optical axis and a reflective surface of the first lens, and f is a focal length of the camera lens.

16. An imaging device, comprising at least one camera lens according to claim 1.

* * * * *